(12) United States Patent
Yan et al.

US010730985B2

(10) Patent No.: US 10,730,985 B2
(45) Date of Patent: Aug. 4, 2020

(54) FUNCTIONALIZED POLYMER, PROCESS FOR PREPARING AND RUBBER COMPOSITIONS CONTAINING THE FUNCTIONALIZED POLYMER

(71) Applicant: Bridgestone Corporation, Chuo-ku (JP)

(72) Inventors: Yuan-Yong Yan, Copley, OH (US); Zengquan Qin, Nashville, TN (US); Koichi Saito, Chuo-ku (JP)

(73) Assignee: Bridgestone Corporation, Chuo-ku (JP)

( * ) Notice: Subject to any disclaimer, the term of this patent is extended or adjusted under 35 U.S.C. 154(b) by 133 days.

(21) Appl. No.: 15/847,263

(22) Filed: Dec. 19, 2017

(65) Prior Publication Data

US 2018/0171053 A1    Jun. 21, 2018

Related U.S. Application Data

(60) Provisional application No. 62/436,183, filed on Dec. 19, 2016.

(51) Int. Cl.
| | |
|---|---|
| *C08F 236/10* | (2006.01) |
| *C08L 9/06* | (2006.01) |
| *C08L 15/00* | (2006.01) |
| *C08C 19/44* | (2006.01) |
| *C08C 19/22* | (2006.01) |
| *C08K 3/36* | (2006.01) |
| *C08K 3/013* | (2018.01) |
| *C08K 3/04* | (2006.01) |

(52) U.S. Cl.
CPC ............ *C08F 236/10* (2013.01); *C08C 19/22* (2013.01); *C08C 19/44* (2013.01); *C08L 9/06* (2013.01); *C08L 15/00* (2013.01); *C08F 2810/40* (2013.01); *C08K 3/013* (2018.01); *C08K 3/04* (2013.01); *C08K 3/36* (2013.01); *C08L 2205/025* (2013.01)

(58) Field of Classification Search
CPC ............... C08F 236/10; C08F 2810/40; C08L 2205/025; C08L 9/06
USPC ........................................................ 524/526
See application file for complete search history.

(56) References Cited

U.S. PATENT DOCUMENTS

| | | |
|---|---|---|
| 3,297,667 A | 1/1967 | von et al. |
| 3,311,596 A | 3/1967 | Berding et al. |
| 4,222,882 A | 9/1980 | Brulet et al. |
| 4,242,232 A | 12/1980 | Sylvester et al. |
| 4,260,707 A | 4/1981 | Sylvester et al. |
| 4,461,883 A | 7/1984 | Takeuchi et al. |
| 4,487,892 A | 12/1984 | Ohmori et al. |
| 4,533,711 A | 8/1985 | Takeuchi et al. |
| 4,575,538 A | 3/1986 | Hsieh et al. |
| 4,663,405 A | 5/1987 | Throckmorton |
| 4,710,553 A | 9/1987 | Carbonaro et al. |
| 4,696,984 A | 12/1987 | Carbonaro et al. |
| 4,736,001 A | 4/1988 | Carbonaro et al. |
| 4,906,706 A | 3/1990 | Hattori et al. |
| 4,929,679 A | 5/1990 | Akita et al. |
| 4,990,573 A | 2/1991 | Andreussi et al. |
| 5,001,196 A | 3/1991 | Kawanaka et al. |
| 5,064,910 A | 11/1991 | Haltori et al. |
| 5,115,006 A | 5/1992 | Watanabe et al. |
| 5,216,080 A | 6/1993 | Suzuki et al. |
| 5,219,942 A | 6/1993 | Suzuki et al. |
| 5,268,413 A | 12/1993 | Antkowiak et al. |
| 5,312,849 A | 5/1994 | Akita et al. |
| 5,536,801 A | 7/1996 | Antkowiak et al. |
| 5,567,784 A | 10/1996 | Wieder et al. |
| 5,622,926 A | 4/1997 | Schade et al. |
| 5,902,856 A * | 5/1999 | Suzuki .................... C08C 19/42 525/237 |
| 5,932,662 A | 8/1999 | Lawson et al. |
| 6,255,416 B1 | 7/2001 | Sone et al. |
| 6,333,375 B1 | 12/2001 | Nakamura et al. |
| 6,391,990 B1 | 5/2002 | Ishino et al. |
| 6,437,205 B1 | 8/2002 | Miller et al. |
| 6,482,930 B1 | 11/2002 | Kwag et al. |
| 6,515,087 B2 | 2/2003 | Hsu et al. |
| 6,521,726 B1 | 2/2003 | Kimura et al. |
| 6,897,270 B2 | 5/2005 | Ozawa et al. |
| 7,008,899 B2 | 3/2006 | Luo et al. |
| 7,055,566 B2 | 6/2006 | Ajbani et al. |
| 7,094,849 B2 | 8/2006 | Luo et al. |
| 7,288,611 B2 | 10/2007 | Jiang et al. |
| 7,396,889 B2 | 7/2008 | Robert |
| 7,741,418 B2 | 6/2010 | Luo et al. |

(Continued)

FOREIGN PATENT DOCUMENTS

| | | |
|---|---|---|
| EP | 0818478 A1 | 1/1998 |
| EP | 3053934 A1 | 8/2016 |

(Continued)

OTHER PUBLICATIONS

International Search Report from PCT application PCT/US2018/065388 dated Apr. 1, 2019.

(Continued)

*Primary Examiner* — Hui H Chin
(74) *Attorney, Agent, or Firm* — Meredith E. Hooker; Jenny L. Sheaffer

(57) ABSTRACT

Disclosed herein are a functionalized diene monomer-containing polymer containing first and second functionalizing groups, processes for preparing the functionalized polymer, and rubber compositions containing the functionalized polymer. The functionalized polymer contains polymer chains comprises of at least one conjugated diene monomer optionally in combination with at least one vinyl aromatic monomer wherein each polymer chain is functionalized at its chain end with at least the first functionalizing group and is coupled via the first functionalizing group to the second functionalizing group.

13 Claims, No Drawings

(56) References Cited

U.S. PATENT DOCUMENTS

| | | |
|---|---|---|
| 7,767,755 B2 | 8/2010 | Yan |
| 7,825,201 B2 | 11/2010 | Luo et al. |
| 7,902,309 B2 | 3/2011 | Luo et al. |
| 8,314,189 B2 | 11/2012 | Luo et al. |
| 9,255,158 B2 | 2/2016 | Lawson et al. |
| 9,447,213 B2 | 9/2016 | Luo |
| 2011/0146877 A1 | 6/2011 | Tanaka et al. |
| 2014/0039080 A1 | 2/2014 | Amamoto et al. |
| 2015/0119493 A1 | 4/2015 | Steinhauser et al. |
| 2015/0252133 A1 | 9/2015 | Morita et al. |
| 2016/0083495 A1 | 3/2016 | Steinhauser et al. |
| 2016/0152756 A1 | 6/2016 | Lawson et al. |
| 2016/0237259 A1 | 8/2016 | Hardy et al. |
| 2018/0282446 A1 | 10/2018 | Uenishi et al. |

FOREIGN PATENT DOCUMENTS

| | | |
|---|---|---|
| EP | 3118251 A1 | 1/2017 |
| JP | 2014-172957 A1 | 9/2014 |
| WO | 2017-045553 A1 | 3/2017 |

OTHER PUBLICATIONS

Written Opinion from PCT application PCT/US2018/065388 dated Apr. 1, 2019.

Hsieh, H.L. et al., "Polymerization of Butadiene and Isoprene with Lanthanide Catalysts Characterization and Properties of Homopolymers and Copolymers," Rubber Chemistry & Technology, vol. 58 (1985), pp. 5903-5908.

Shen, Z., et al., "The Characteristics of Lanthanide Coordination Catalysts and the cis-Polydienes Prepared Therewith," Journal of Polymer Science: Polymer Chemistry Edition, vol. 18 (1980), pp. 3345+.

Quirk, R.P., et al., "Butadiene Polymerization Using Neodymium Versatate-Based Catalysts: Catalyst Optimization and Effects of Water and Excess Versatic Acid," Polymer, vol. 41 (2000), pp. 5903-5908.

Friebe, L. et al., "Neodymium Based Zieger Catalysts-Fundamental Chemistry," Advances in Polymer Science, vol. 204 (2006), pp. 1-154.

Zhang, Z., "Polymerization of 1,3-Conjugated Dienes with Rare Earth Metal Precursors," Structural Bond., vol. 137 (2010), pp. 49-108.

\* cited by examiner

FUNCTIONALIZED POLYMER, PROCESS FOR PREPARING AND RUBBER COMPOSITIONS CONTAINING THE FUNCTIONALIZED POLYMER

CROSS-REFERENCE TO RELATED APPLICATIONS

This application claims priority to and any other benefit of U.S. Provisional Patent Application Ser. No. 62/436,183 filed on Dec. 19, 2016 and entitled "FUNCTIONALIZED POLYMER, PROCESS FOR PREPARING AND RUBBER COMPOSITIONS CONTAINING THE FUNCTIONALIZED POLYMER," the entire disclosure of which is incorporated by reference herein.

FIELD

The present application is directed to a functionalized polymer containing first and second functionalizing groups, processes for preparing the functionalized polymer, and rubber compositions containing the functionalized polymer.

BACKGROUND

Rubber compositions utilized in various tire components such as tire treads are frequently reinforced with fillers such as carbon black and/or silica. The use of functionalized polymers may influence the dispersion of such filler(s) as well as filler-polymer interaction and may yield improved properties in the resulting rubber composition.

SUMMARY

Disclosed herein is a functionalized diene monomer-containing polymer containing first and second functionalizing groups. Also disclosed are processes for preparing the functionalized polymer as well as rubber compositions containing the functionalized polymer.

In a first embodiment, a process for preparing a functionalized diene monomer-containing polymer is disclosed. The process comprises: (a) polymerizing at least one conjugated diene monomer and optionally at least one vinyl aromatic monomer to produce polymer chains with a living end; (b) reacting the living end polymer chains from (a) with a first functionalizing compound selected from structure I or structure II, thereby producing an intermediary product including polymer chains end functionalized with the first functionalizing compound; and (c) coupling the intermediary product from (b) with a second functionalizing compound selected from structure III, or IV, thereby forming a final product including functionalized diene monomer-containing polymers having a trans-bond content of no more than 60% and functionalized with both a first functionalizing group resulting from the first functionalizing compound and a second functionalizing group resulting from the second functionalizing compound.

In a second embodiment, a functionalized diene monomer-containing polymer is disclosed. The functionalized polymer comprises at least one polymer chain comprised of at least one conjugated diene monomer, optionally in combination with at least one vinyl aromatic monomer, wherein each polymer chain is functionalized at its chain end with at least a first functionalizing group and is coupled via the first functionalizing group to a second functionalizing group. According to the second embodiment, the first functionalizing group results from a first functionalizing compound selected from structure I or structure I, and the second functionalizing group results from a second functionalizing compound selected from structure III, or structure IV. Further according to the second embodiment, the functionalized diene monomer-containing polymer has the first functionalizing group present in a ratio of 1:1 to 6:1 compared to the second functionalizing group.

In a third embodiment, a rubber composition is disclosed which comprises (a) 10-100 parts of at least one functionalized diene monomer-containing polymer according to the second embodiment or produced according to the process of the first embodiment; (b) 0-90 parts of at least one diene monomer-containing polymer, preferably selected from the group consisting of natural rubber, polyisoprene, polybutadiene rubber, styrene-butadiene rubber, styrene-butadiene-isoprene rubber, isoprene-butadiene rubber, and combinations thereof; and (c) 10-100 phr of at least one carbon black filler and 0-100 phr of at least one silica filler.

DETAILED DESCRIPTION

Disclosed herein is a functionalized diene monomer-containing polymer containing first and second functionalizing groups. Also disclosed are processes for preparing the functionalized polymer as well as rubber compositions containing the functionalized polymer.

In a first embodiment, a process for preparing a functionalized diene monomer-containing polymer is disclosed. The process comprises: (a) polymerizing at least one conjugated diene monomer and optionally at least one vinyl aromatic monomer to produce polymer chains with a living end; (b) reacting the living end polymer chains from (a) with a first functionalizing compound selected from structure I or structure II, thereby producing an intermediary product including polymer chains end functionalized with the first functionalizing compound; and (c) coupling the intermediary product from (b) with a second functionalizing compound selected from structure HI, or IV, thereby forming a final product including functionalized diene monomer-containing polymers having a trans-bond content of no more than 60% and functionalized with both a first functionalizing group resulting from the first functionalizing compound and a second functionalizing group resulting from the second functionalizing compound.

In a second embodiment, a functionalized diene monomer-containing polymer is disclosed. The functionalized polymer comprises at least one polymer chain comprised of at least one conjugated diene monomer, optionally in combination with at least one vinyl aromatic monomer, wherein each polymer chain is functionalized at its chain end with at least a first functionalizing group and is coupled via the first functionalizing group to a second functionalizing group. According to the second embodiment, the first functionalizing group results from a first functionalizing compound selected from structure I or structure I, and the second functionalizing group results from a second functionalizing compound selected from structure III, or structure IV. Further according to the second embodiment, the functionalized diene monomer-containing polymer has the first functionalizing group present in a ratio of 1:1 to 6:1 compared to the second functionalizing group.

In a third embodiment, a rubber composition is disclosed which comprises (a) 10-100 parts of at least one functionalized diene monomer-containing polymer according to the second embodiment or produced according to the process of the first embodiment; (b) 0-90 parts of at least one diene monomer-containing polymer, preferably selected from the group consisting of natural rubber, polyisoprene, polybutadiene rubber, styrene-butadiene rubber, styrene-butadiene-isoprene rubber, isoprene-butadiene rubber, and combinations thereof; and (c) 10-100 phr of at least one carbon black filler and 0-100 phr of at least one silica filler.

Definitions

The terminology as set forth herein is for description of the embodiments only and should not be construed as limiting the invention as a whole.

As used herein, the term "live end" (e.g., live end of a polymer chain) is used to refer to a polymer species having a living end that has not yet been terminated; the living end is capable of reacting with a functionalizing compound and, thus, can be described as reactive.

As used herein, the term "majority" means more than 50% (e.g., 50.5%, 51%, 60%, etc.) and may encompass 100%.

As used herein, the term "natural rubber" means naturally occurring rubber such as can be harvested from sources such as Hevea rubber trees and non-Hevea sources (e.g., guayule shrubs and dandelions such as TKS). In other words, the term "natural rubber" should be construed so as to exclude synthetic polyisoprene.

As used herein, the term "phr" means parts per one hundred parts rubber. The 100 parts rubber refers to 100 parts of the elastomer. As a non-limiting example, in an exemplary rubber composition according to the third embodiment which contains 50 parts of a functionalized diene monomer-containing polymer according to the second embodiment, 50 parts of polybutadiene, and 50 parts of silica filler, the amount of silica filler can be referred to as 50 phr.

As used herein the term "polyisoprene" means synthetic polyisoprene. In other words, the term is used to indicate a polymer that is manufactured from isoprene monomers, and should not be construed as including naturally occurring rubber (e.g., Hevea natural rubber, guayule-sourced natural rubber, or dandelion-sourced natural rubber). However, the term polyisoprene should be construed as including polyisoprenes manufactured from natural sources of isoprene monomer.

As used herein, the term "polymer" is meant to encompass both polymers (i.e., containing repeating units from one monomer) and copolymers (i.e., containing repeating units from two or more monomers).

Functionalized Diene Monomer-Containing Polymer

As discussed above, according to the second embodiment, a functionalized diene monomer-containing polymer is provided and similarly, a functionalized diene monomer-containing polymer is produced by the process of the first embodiment. As well, the rubber composition of the third embodiment utilizes the functionalized diene monomer-containing polymer of the second embodiment or the functionalized diene monomer-containing polymer resulting from the process of the first embodiment. According to the first-third embodiments, the functionalized diene monomer-containing polymer or polymer chain has a trans-bond content of no more than 60% by weight (e.g., 60% by weight or less, 55% by weight or less, 50% by weight or less, 45% by weight or less, 40% by weight or less, 35% by weight or less, 30% by weight or less). In certain embodiments of the first-third embodiments, the functionalized diene monomer-containing polymer or polymer chain has a trans-bond content of 25-60% by weight (e.g., 25%, 30%, 35%, 40%, 45%, 50%, 55%, or 60%). The trans bond content in the butadiene portion of a polymer chain or the resulting terminal-functionalized polymer can be determined by $H^1$-NMR and $C^{13}$-NMR (e.g., using a 300 MHz Gemini 300 NMR Spectrometer System (Varian).

In certain embodiments of the first third embodiments, the functionalized diene monomer-containing polymer comprises styrene-butadiene or polybutadiene; in certain such embodiments the polybutadiene is a high-cis polybutadiene having a cis-bond content of at least 90% or 95% or more). In certain embodiments of the first-third embodiments, the functionalized diene monomer-containing polymer is a styrene-butadiene polymer.

Conjugated Diene Monomer

As discussed above, according to the first-third embodiments, the functionalized diene monomer-containing polymer or polymer chain includes at least one conjugated diene monomer, optionally in combination with at least one vinyl aromatic monomer. A conjugated diene is a compound that has two double carbon-carbon bonds (i.e., two —C=C— bonds) that are separated by a single bond (i.e., —C—C—); thus, a conjugated diene will contain at least one —C=C—C=C— moiety. The particular structure of the conjugated diene monomer present in the polymer chain or contained within the functionalized polymer of the first-third embodiments disclosed herein can vary. According to the first-third embodiments, one or more than one type of conjugated diene monomer can be utilized. By referring herein to one or more than one type of conjugated diene monomer is meant that the conjugated diene monomers may comprise all one formula or a mixture of formulas. As a non-limiting example, two types of conjugated diene monomers could encompass a combination of 1,3-butadiene and isoprene. In certain embodiments of the first-third embodiments disclosed herein, the conjugated diene monomer comprises at least one of 1,3-butadiene; isoprene; 1-3-pentadiene; 2,3-dimethyl-1,3-butadiene; 2-ethyl-1,3-butadiene; 2-methyl-1, 3-pentadiene; 3-methyl-1,3-pentadiene; 4-methyl-1,3-pentadiene; 2,4-hexadiene; 1,3-hexadiene; 1,3-cyclopentadiene; 1,3-cyclohexadiene; 1,3-cycloheptadiene; or 1,3-cyclooctadiene. In certain embodiments of the first-third embodiments, the conjugated diene monomer comprises 1,3-butadiene. In certain embodiments of the first-third embodiments, the conjugated diene monomer comprises 1,3-butadiene in combination with isoprene. In certain embodiments of the first-third embodiments, the only conjugated diene monomer utilized is 1,3-butadiene.

Vinyl Aromatic Monomer

As discussed above in certain embodiments of the first-third embodiments, the functionalized conjugated diene monomer-containing polymer or polymer chain contains at least one vinyl aromatic monomer in addition to the at least one conjugated diene monomer. In other embodiments of the first-third embodiments, the functionalized conjugated diene monomer-containing polymer or polymer chain contains at least one conjugated diene monomer but is devoid of any vinyl aromatic monomer (i.e., 0% by weight of the conjugated diene monomer-containing polymer or polymer chain comprises vinyl aromatic monomer). In certain embodiments of the first-third embodiments disclosed herein, the at least one type of vinyl aromatic monomer is present and comprises at least one of styrene, alpha-methyl styrene, p-methylstyrene, o-methylstyrene, p-butylstyrene, vinyl naphthalene, p-tertbutylstyrene, 4-vinylbiphenyl, 4-vinylbenzocyclobutene, 2-vinylnaphthalene, 9-vinylanthracene, 4-vinylanisole, or vinyl catechol. In certain embodiments of the first-third embodiments disclosed herein, the at least one type vinyl aromatic monomer comprises styrene. In certain embodiments of the first-third embodiments disclosed herein, the functionalized polymer or polymer chain comprises 1,3-butadiene optionally in combination with styrene. In certain embodiments of the first-third embodiments, the only vinyl aromatic monomer utilized is styrene. In certain embodiments of the first-third embodiments wherein the functionalized polymer or polymer chain comprises at least one conjugated diene monomer in combination with at least one type of vinyl aromatic monomer, they are utilized at a weight ratio of 95:5 to 50:50, including 95:5 to 65:35. In certain embodiments of the first-third embodiments wherein the functionalized polymer or polymer chain comprises a combination of 1,3-butadiene and styrene monomers, the styrene content of the functionalized polymer or the polymer chain is about 10 to about 50% (e.g., 10%, 15%, 20%, 25%, 30%, 35%, 40%, 45%, 50%) of weight of the total monomer content (i.e., 1,3-butadiene+styrene), including 10-50% by weight, about 18 to about 40% by weight, and 18-40% by weight. In certain embodiments of the first-third embodiments wherein the functionalized polymer or polymer chain comprises a combination of 1,3-butadiene and styrene, the functionalized polymer or polymer chain has a microstructure with about 8 to about 99% (e.g., 8%, 10%, 15%, 20%, 25%, 30%, 35%, 40%, 45%, 50%, 55%, 60%, 65%, 70%, 80%, 85%, 90%, 95%, 99%) by mass vinyl bonds (1,2-vinyl) in the butadiene portion, including 8-99%, about 10 to about 60% and 10-60% by weight. The vinyl bond content in the butadiene portion of a polymer chain or the resulting terminal-functionalized polymer can be determined by $H^1$-NMR and $C^{13}$-NMR (e.g., using a 300 MHz Gemini 300 NMR Spectrometer System (Varian).

First Functionalizing Group/First Functionalizing Compound

As discussed above, the functionalized diene monomer-containing polymer of the second embodiment is functionalized at each chain end with at least a first functionalizing group. The first functionalizing group results from a first functionalizing compound selected from structure I or structure II. The rubber composition of the third embodiment may incorporate the functionalized diene monomer-containing polymer of the second embodiment (i.e., which is functionalized at each chain end with at least a first functionalizing group resulting from a first functionalizing compound having structure I or structure II). The functionalized diene monomer-containing polymer which results from the process of the first embodiment may also be described as being functionalized at each chain end with at least a first functionalizing group, as discussed above, a structure which results from reacting the living end polymer chain with a first functionalizing compound selected from structure I or structure II.

According to the first-third embodiments, structure I is as follows:

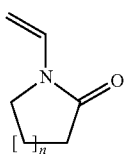

I wherein n is an integer of 0 to 16 (e.g., 0, 1, 2, 3, 4, 5, 6, 7, 8, 9, 10, 11, 12, 13, 14, 15, or 16). In certain embodiments of the first-third embodiments, wherein a first functionalizing compound having structure I is utilized or the first functionalizing group results from a first functionalizing compound having structure I, n is an integer of 0 to 10, or 0 to 6. Exemplary compounds having structure I, include, but are not limited to: N-vinylcaprolactam, N-vinylpyrrolidinone (also known as N-vinylpyrrolidinone, 1-vinyl-2-pyrrolidinone and N-vinylpyrrolidone), N-vinylpiperidone (also known as N-vinyl-2-piperidone or 1-vinyl-2-piperidone), N-vinyl-4-butyl pyrrolidone, N-vinyl-4-propyl pyrrolidone, N-vinyl-4-methyl caprolactam, N-vinyl-6-methyl caprolactam, and N-vinyl-7-butyl caprolactam.

According to the first-third embodiments, structure II is as follows

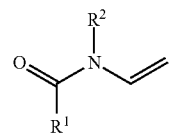

II wherein $R^1$ is selected from H and hydrocarbyl of C1-C20 (e.g., C1, C2, C3, C4, C5, C6, C7, C8, C9, C10, C11, C12, C13, C14, C15, C16, C17, C18, C19, or C20) and $R^2$ is selected from H and hydrocarbyl of C1-C20 (e.g., C1, C2, C3, C4, C5, C6, C7, C8, C9, C10, C11, C12, C13, C14, C15, C16, C17, C18, C19, or C20). In certain embodiments of the first-third embodiments, wherein a first functionalizing compound having structure II is utilized or the first functionalizing group results from a first functionalizing compound having structure II, $R^1$, $R^2$ or both are selected from H and hydrocarbyl of C1-C10.

According to the first-third embodiments, functionalization at each polymer chain end with the first functionalizing group means that the end of the polymer is bonded to the first functionalizing group. In those embodiments of the first-third embodiments wherein the first functionalizing group results from a first functionalizing compound having structure I, the polymer chain may be bonded to either the beta-carbon from the vinyl group attached to the nitrogen (in which case, the alpha and beta carbons from the vinyl group will no longer be double-bonded) or to the carbon of the carbonyl (in which case, that carbon will no longer be double-bonded to the oxygen). The above-described points of attachment of the polymer chain are illustrated below in structures I-A and I-B with the * indicating the point of attachment of the polymer chain to a first functionalizing group resulting from a first functionalizing compound of structure I.

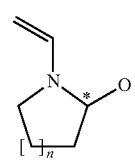

I-A

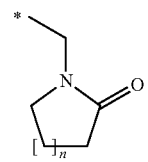

I-B

In those embodiments of the first-third embodiments wherein the first functionalizing group results from a first functionalizing compound having structure II, the polymer chain may be bonded to either the beta-carbon from the vinyl group attached to the nitrogen (in which case, the alpha and beta carbons from the vinyl group will no longer be double-bonded) or to the carbon of the carbonyl (in which case, that carbon will no longer be double-bonded to the oxygen). The above-described points of attachment of the polymer chain are illustrated below in structures II-A and II-B with the * indicating the point of attachment of the polymer chain to a first functionalizing group resulting from a first functionalizing compound of structure II.

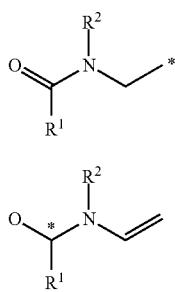

In certain embodiments of the second and third embodiments, at least 10% (e.g., 10%, 15%, 20%, 25%, 30%, 35%, 40%, 45%, 50%, 55%, 60%, 65%, 70%, 75%, 80%, 85%, 90% or more) of the functionalized conjugated diene monomer-containing polymers (i.e., the final product polymer) will be functionalized at the chain end with both the first functionalizing group (which results from the first functionalizing compound, as explained above) and with the second functionalizing group which results from the second functionalizing compound, as explained below). In other words, at least 1 in 10 of the polymers will be functionalized with both the first functionalizing group and the second functionalizing group. In certain embodiments of the second and third embodiments, 30 to 90% of the functionalized conjugated diene monomer-containing polymers (i.e., the final product polymer) will be functionalized at the chain end with both the first functionalizing group (which results from the first functionalizing compound, as explained above) and with the second functionalizing group which results from the second functionalizing compound, as explained below). The foregoing percentages can be considered to be a molar % since they refer to the relative number of polymer chains that are functionalized with both a first and a second functionalizing group.

Second Functionalizing Group/Second Functionalizing Compound

As discussed above, the functionalized diene monomer-containing polymer of the second embodiment is not only functionalized at each chain end with at least a first functionalizing group but is also coupled via the first functionalizing group to a second functionalizing group. The second functionalizing group results from a second functionalizing compound selected from structure III, or structure IV. The rubber composition of the third embodiment may incorporate the functionalized diene monomer-containing polymer of the second embodiment (i.e., which is not only functionalized at each chain end with at least a first functionalizing group resulting from a first functionalizing compound but is also coupled via the first functionalizing group to a second functionalizing group). The functionalized diene monomer-containing polymer which results from the process of the first embodiment may also be described as being functionalized at each chain end with at least a first functionalizing group (which results from reacting the living end polymer chain with a first functionalizing compound selected from structure I or structure II) and coupled via the first functionalizing group to a second functionalizing group resulting from a second functionalizing compound having structure III, or structure IV.

According to the first-third embodiments, structure III is as follows:

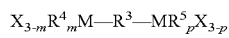

wherein each M is an atom independently selected from Si and Sn; each X is a halogen; m is an integer of 0 or 1; p is an integer of 0 or 1; $R^4$ and $R^5$ when present are selected from C1-C20 hydrocarbyl (e.g., C1, C2, C3, C4, C5, C6, C7, C8, C9, C10, C11, C12, C13, C14, C15, C16, C17, C18, C19, or C20); and $R^3$ is a divalent hydrocarbon of C1-C20 (e.g., C1, C2, C3, C4, C5, C6, C7, C8, C9, C10, C11, C12, C13, C14, C15, C16, C17, C18, C19, or C20), and may be linear or branched alkylene, linear or branched alkenylene or C6 to C20 arylene. In certain embodiments of the first-third embodiments, each M is Si. In certain embodiments of the first-third embodiments, each X of structure III is a halogen independently selected from chlorine or bromine. In certain embodiments of the first-third embodiments, each X of structure III is chlorine. In certain embodiments of the first-third embodiments, m is an integer of 0 and p is an integer of 1. In certain embodiments of the first-third embodiments, m is an integer of 0 and p is an integer of 0. In certain embodiments of the first-third embodiments, m is an integer of 1 and p is an integer of 0. In certain embodiments of the first-third embodiments, m is an integer of 1 and p is an integer of 1. In certain embodiments of the first-third embodiments, $R^3$ of structure III is a divalent hydrocarbon of C2-C12 and may be linear or branched alkylene, linear or branched alkenylene or C6 to C20 arylene. In certain embodiments of the first-third embodiments, $R^3$ of structure III is a divalent hydrocarbon of C1-C20 or C2-C12 and is linear or branched alkylene. In certain embodiments of the first-third embodiments, $R^3$ of structure III is a divalent hydrocarbon of C2 to C20 or C2 to C12 and is linear or branched alkenylene. In certain embodiments of the first-third embodiments, $R^3$ of structure III is arylene of C6 to C20. In certain embodiments of the first-third embodiments, $R^4$ and $R^5$ (when present) are selected from C1-C20 or C1-C10 and are alkyl or aryl.

According to the first-third embodiments, structure IV is as follows:

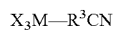

wherein M is an atom selected from Si and Sn, each X is a halogen, and $R^3$ is a divalent hydrocarbon of C1-C20 (e.g., C1, C2, C3, C4, C5, C6, C7, C8, C9, C10, C11, C12, C13, C14, C15, C16, C17, C18, C19, or C20), and may be linear or branched alkylene, linear or branched alkenylene or C6 to C20 arylene. In certain embodiments of the first-third embodiments, $R^3$ of structure IV is a divalent hydrocarbon of C2-C12 and may be linear or branched alkylene, linear or branched alkenylene or C6 to C20 arylene. In certain embodiments of the first-third embodiments, $R^3$ of structure IV is a divalent hydrocarbon of C1-C20 (e.g., C1, C2, C3, C4, C5, C6, C7, C8, C9, C10, C11, C12, C13, C14, C15, C16, C17, C18, C19, or C20) or C2-C12 and is linear or branched alkylene. In certain embodiments of the first-third embodiments, $R^3$ of structure IV is a divalent hydrocarbon of C2 to C20 (e.g., C2, C3, C4, C5, C6, C7, C8, C9, C10, C11, C12, C13, C14, C15, C16, C17, C18, C19, or C20) or C2 to C12 and is linear or branched alkenylene. In certain embodiments of the first-third embodiments, $R^3$ of structure IV is arylene of C6 to C20.

By stating that the polymer is coupled via the first functionalizing group to a second functionalizing group is meant that the polymer or polymer chain is directly attached to the first functionalizing group (as discussed above), and an atom within the first functionalizing group is attached to an atom within the second functionalizing group. Generally, coupling of the polymer or polymer chain to the second functionalizing group via the first functionalizing group will result from loss of a halogen from the second functionalizing group, resulting in attachment of the first functionalizing group to the Si or Sn of the second functionalizing group. The Si or Sn of the first functionalizing group will bond either to the beta carbon from the vinyl group (of either structure I or structure II) when the polymer or polymer chain is bonded to that beta carbon or to the oxygen from the carbonyl group (of either structure I or structure II) when the polymer or polymer chain is bonded to the carbon from that carbonyl group. In those embodiments of the first-third embodiments, wherein the second functionalizing group contains more than one halogen, more than one polymer or polymer chain may bond to the second functionalizing group via its respective first functionalizing group. In certain embodiments of the first-third embodiments, the functionalizing diene monomer-containing polymers will have a molar ratio of first functionalizing group to second functionalizing group of 1:1 to 6:1 (e.g., 1:1, 2:1, 3:1, 4:1, 5:1, or 6:1), and in certain embodiments 2:1 to 6:1. In other words, to each second functionalizing group may be coupled to from 1 to 6 polymer chains with each polymer chain being end functionalized with a first functionalizing group and the coupling occurring via bonding of the first functionalizing group to the second functionalizing group.

The functionalized polymer or polymer chain which is functionalized at its chain end with at least a first functionalizing group and is coupled via the first functionalizing compound to a second functionalizing group that results from a second functionalizing compound of structure III that can be understood to have a structure which corresponds to the formula:

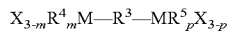

wherein at least one X (e.g., one X, two X, three X, four X, five X, or six X) has been replaced with structure I-A, I-B, II-A, II-B, or a combination thereof (as discussed above), preferably at least two X are replaced. Preferably, at least a majority of the halogens in a given quantity of second functionalizing compound having structure III are replaced with structure I-A, I-B, II-A, II-B, or a combination thereof and in certain embodiments, 51% to 95% (e.g., 51%, 55%, 60%, 65%, 70%, 75%, 80%, 85%, 90%, 95%) or 60 to 90% of the halogens are replaced with structure I-A, I-B, or a combination thereof.

The functionalized polymer or polymer chain which is functionalized at its chain end with at least a first functionalizing group and is coupled via the first functionalizing compound to a second functionalizing group that results from a second functionalizing compound of structure IV that can be understood to have a structure which corresponds to the formula:

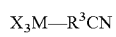

wherein at least one X (e.g., one X, two X, or three X) has been replaced with structure I-A, I-B, II-A, II-B, or a combination thereof (as discussed above). Preferably, at least a majority of the halogens in a given quantity of second functionalizing compound having structure IV are replaced with structure I-A, I-B, II-A, II-B, or a combination thereof and in certain embodiments, 51% to 95% (e.g., 51%, 55%, 60%,65%, 70%, 75%, 80%, 85%, 90%, 95%) or 60 to 90% of the halogens are replaced with structure I-A, I-B, II-A, II-B, or a combination thereof.

Processes for Preparing the Functionalized Diene Monomer-Containing Polymer

As discussed above, according to the first embodiment, a process for preparing a functionalized diene monomer-containing polymer is disclosed. The process comprises: (a) polymerizing at least one conjugated diene monomer and optionally at least one vinyl aromatic monomer to produce polymer chains with a living end; (b) reacting the living end polymer chains from (a) with a first functionalizing compound selected from structure I or structure II, thereby producing an intermediary product including polymer chains end functionalized with the first functionalizing compound; and (c) reacting the intermediary product from (b) with a second functionalizing compound selected from structure III, IV, or V, thereby forming a final product including functionalized diene monomer-containing polymers having a trans-bond content of no more than 60% and functionalized with both the first functionalizing compound and the second functionalizing compound. According to the first embodiment, the functionalized diene monomer-containing polymers that are produced as part of the final product and are functionalized with both a first functionalizing group (resulting from the first functionalizing compound) and the second functionalizing group (resulting from the second functionalizing compound) compound can more specifically be described as having polymer chains that are functionalized at their chain ends with at least a first functionalizing group and are coupled via the first functionalizing group to the second functionalizing group.

Polymerizing

As mentioned above, the process of the first embodiment includes polymerizing at least one conjugated diene monomer and optionally at least one vinyl aromatic monomer to produce polymer chains with live ends. The live ends of the polymer chains are reacted with a first functionalizing compound. Polymerization of the monomer or monomers may take place by various processes such as by anionic polymerization.

In certain embodiments of the first embodiment disclosed herein, the polymerizing is anionically initiated. In other words, in certain embodiments of the first embodiment, the polymerizing of the at least one conjugated diene monomer and optionally at least one vinyl aromatic monomer comprises anionic polymerization including an initiator. Anionic polymerization of conjugated diene monomers generally involves the use of an anionic initiator in combination with the monomer(s) and an optional solvent, the general process of which (i.e., other than the use of the functionalizing compound disclosed herein) is well known to those having skill in the art. Generally, the monomer or monomers are polymerized according to various suitable methods such as batch, semi-continuous, or continuous operations. The polymerization can also be carried out in a number of different polymerization reactor systems, including but not limited to bulk polymerization, vapor phase polymerization, solution polymerization, suspension polymerization, and emulsion polymerization; in solution polymerization, the concentration of the monomer(s) in the solution is preferably within a range of 5 to 50% by mass, more preferably 10 to 30% by mass. The polymerization system is not particularly limited and may be a batch system or a continuous system. In certain embodiments of the first embodiment disclosed herein, an anionic polymerization is conducted utilizing an anionic initiator, generally an organic alkaline metal compound, preferably a lithium-containing compound. Examples of lithium-containing compounds useful as anionic initiators include, but are not limited to, hydrocarbyl lithium compounds, lithium amide compounds, and similar sodium compounds. In certain embodiments of the first embodiment disclosed herein, the amount of the lithium compound used as the anionic initiator is preferably within a range of 0.2 to 20 millimoles per 100 g of the monomer. In certain embodiments of the first embodiment, a functionalized initiator is utilized. Non-limiting examples of functionalized initiators include organic alkaline metal compounds (e.g., an organolithium compound) that additionally include one or more heteroatoms (e.g., nitrogen, oxygen, boron, silicon, sulfur, tin, and phosphorus atoms) or heterocyclic groups containing the foregoing, frequently one or more nitrogen atoms (e.g., substituted aldimines, ketimines, secondary amines, etc.) optionally pre-reacted with a compound such as diisopropenyl benzene. Many functional initiators are known in the art. Exemplary ones are disclosed in U.S. Pat. Nos. 5,153,159, 5,332,810, 5,329,005, 5,578,542, 5,393,721, 5,698,464, 5,491,230, 5,521,309, 5,496,940, 5,567,815, 5,574,109, 5,786,441, 7,153,919, 7,868,110 and U.S. Patent Application Publication No. 2011-0112263, which are incorporated herein by reference. In certain preferable embodiments when a functional initiator is utilized, the functional group added by the initiator is different from the functional group added by the functionalizing compounds disclosed herein. In certain embodiments of the first embodiment, a functional nitrogen-containing initiator is utilized; non-limiting examples include cyclic amines, particularly cyclic secondary amines such as azetidine; pyrrolidine; piperidine; morpholine; N-alkyl piperazine; hexamethyleneimine; heptamethyleneimine; and dodecamethyleneimine.

Non-limiting examples of hydrocarbyl lithium compounds include ethyl lithium, n-propyl lithium, isopropyl lithium, n-butyl lithium, sec-butyl lithium, tert-octyl lithium, n-decyl lithium, phenyl lithium, 2-naphthyl lithium, 2-butylphenyl lithium, 4-phenyl-butyl lithium, cyclohexyl lithium, cyclopentyl lithium, a reaction product of diisopropenylbenzene and butyl lithium, and mixtures thereof. Among these, alkyl lithium compounds such as ethyl lithium, n-propyl lithium, isopropyl lithium, n-butyl lithium, sec-butyl lithium, tert-octyl lithium, n-decyl lithium and so on are preferable, and n-butyl lithium is particularly preferable. Generally, the anionic polymerization is conducted using monomers in a hydrocarbon solvent inactive to the polymerization reaction, examples of which include hydrocarbon solvents such as aromatic hydrocarbon, aliphatic hydrocarbon, or cycloaliphatic hydrocarbon. Non-limiting examples of hydrocarbon solvents inactive to the polymerization reaction include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene, and mixtures thereof.

In certain embodiments of the first embodiment, the anionic polymerization process is carried out in the presence of a randomizer. The randomizer can control the microstructure of the resulting polymer, and has an action such that the 1,2-bond content in the butadiene unit (or butadiene portion) of the polymer using, for example, 1,3-butadiene as a monomer is controlled, and butadiene units and styrene units in the copolymer using 1,3-butadiene and styrene as a monomer are randomized, or the like. Non-limiting examples of the randomizer include dimethoxybenzene, tetrahydrofuran, linear and cyclic oligomeric oxolanyl alkanes such as 2,2-bis(2'-tetrahydrofuryl)propane, dimethoxyethane, diethylene glycol dibutyl ether, diethylene glycol dimethyl ether, bis tetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on. The amount of the randomizer used is preferably within a range of 0.01 to 100 molar equivalents per 1 mole of the organic alkaline metal compound as a polymerization initiator.

The polymerization temperature in the anionic polymerization is preferably within a range of 0 to 150° C., more preferably 20 to 130° C. The polymerization may be carried out under a generating pressure or, preferably, at a pressure sufficient to keep the reaction monomers substantially in a liquid phase. When the polymerization reaction is carried out under a pressure higher than the generating pressure, the reaction system is preferably pressurized with an inert gas. Preferably, any reaction-obstructing substances, such as water, oxygen, carbon dioxide, protonic compounds, and the like are removed before beginning the polymerization reaction.

Reacting Living End Polymer Chains With First Functionalizing Compound

As discussed above, the process of the first embodiment includes reacting the living end polymer chains with a first functionalizing compound selected from structure I or structure II. According to the first embodiment, one or more than one first functionalizing compound may be utilized. In certain embodiments of the first embodiment, only one type of first functionalizing compound is utilized. In certain embodiments of the first embodiment, the first functionalizing compound is selected from compounds having structure I. In other embodiments of the first embodiment, the first functionalizing compound is selected from compounds having structure II. In certain embodiments of the first embodiment, the first functionalizing compound, the second functionalizing compound, or both, will be diluted in one or more solvents prior to use in the process; in certain such embodiments, the solvent comprises a hydrocarbon solvent (e.g., hexane, cyclohexane).

According to the process of the first embodiment, polymerization of the monomer(s) is allowed to proceed sufficiently to produce a desired amount of living end polymer chains before the first functionalizing compound is added. The amount of time for which the polymerization is allowed to proceed may be influenced by the concentration of reactants (e.g., initiator, monomer or monomers) as well as by reaction conditions (e.g., temperature). In certain embodiments of the first embodiment, polymerization is allowed to proceed until a temperature peak is achieved and thereafter (i.e., once the reaction temperature begins to decrease), the first functionalizing compound is added. In certain embodiments of the first embodiment, the polymerization is allowed to proceed for 0.2 to 5 hours (e.g., 0.2, 0.3, 0.4, 0.5, 1, 1.5, 2, 2.5, 3, 3.5, 4, 4.5, or 5 hours), preferably 0.5 to 2 hours prior to adding the first functionalizing compound.

According to the process of the first embodiment, the amount of first functionalizing compound used to react with the living end polymer chains may vary. Generally, the amount of first functionalizing compound can be described based upon the amount of initiator used in polymerizing the monomer(s). Preferably, the amount of first functionalizing compound that is utilized will be sufficient to functionalize a majority of the living end polymer chains. In certain embodiments of the first embodiment, the amount of first functionalizing compound that is utilized will be sufficient to functionalize at least 60%, at least 70%, at least 80%, at least 90%, or 51-95%, or 60-90%, of the living end polymer chains. The foregoing percentages can be considered to be a molar % since they refer to the relative number of polymer chains that are functionalized by a first functionalizing compound. In certain embodiments of the first embodiment, the first functionalizing compound is utilized in a molar ratio of about 0.1:1 to about 2:1 (e.g., 0.1:1, 0.2:1, 0.3:1, 0.4:1, 0.5:1, 0.6:1, 0.7:1, 0.8:1, 0.9:1, 1:1, 1.1:1, 1.2:1, 1.3:1, 1.4:1, 1.5:1, 1.6:1, 1.7:1, 1.8:1, 1.9;1, or 2:1) or 0.1:1 to 1:1, preferably about 0.1:1 to about 1:1 or 0.1:1 to 1:1, even more preferably about 0.5:1 to 0.95:1 or 0.5:1 to 0.95:1 (e.g., 0.5:1, 0.6:1, 0.7:1, 0.8:1, 0.9:1, or 0.95:1), based upon the amount of initiator used in polymerizing the monomer(s).

As discussed above, the process of the first embodiment includes reacting the living end polymer chains (from the polymerization) with a first functionalizing compound selected from structure I or structure II. Structures I and II are discussed above and such discussion should be considered applicable to the process of the first embodiment.

Coupling With Second Functionalizing Compound

As discussed above, the process of the first embodiment includes coupling the intermediary product (i.e., the product which results from reacting the living end polymer chains with a first functionalizing compound) with a second functionalizing compound. More specifically, the polymer chain ends which are functionalized with a first functionalizing compound are coupled to a second functionalizing compound. The term coupling is used to connote the ability of the second functionalizing compound to bond with more than one polymer chain end which is functionalized with a first functionalizing compound. According to the process of the first embodiment, one or more than one second functionalizing compound may be utilized. As a result of the coupling with the second functionalizing compound, a final product is formed which includes functionalized diene monomer-containing polymers having a trans-bond content of no more than 60% and is functionalized with both the first functionalizing compound and the second functionalizing compound. The final product polymer may also be described as functionalized at the polymer chain ends with a first functionalizing group (resulting from the first functionalizing compound) and coupled via the first functionalizing group to a second functionalizing group (resulting from the second functionalizing group).

In certain embodiments of the first embodiment, only one type of second functionalizing compound is utilized. In certain embodiments of the first embodiment, the second functionalizing compound is selected from compounds having structure III. In other embodiments of the first embodiment, the first functionalizing compound is selected form compounds having structure IV.

According to the process of the first embodiment, reaction of the living end polymer chains with the first functionalizing compound is allowed to proceed sufficiently to before the second functionalizing compound is added. The amount of time for which the reaction with the first functionalizing compound is allowed to proceed may be influenced by the concentration of reactants (e.g., living end polymer chains, first functionalizing compound) as well as by reaction conditions (e.g., temperature). In certain embodiments of the first embodiment, the reaction of the living end polymer chains with the first functionalizing compound is allowed to proceed until a majority of the living end polymer chains have reacted with the first functionalizing compound. In certain embodiments of the first embodiment, at least 60%, at least 70%, at least 80%, at least 90%, or 51-95%, or 60-90%, of the living end polymer chains will have reacted with the first functionalizing compound before the second functionalizing compound is added. The foregoing percentages can be considered to be a molar % since they refer to the relative number of polymer chains that reacted with the first functionalizing compound. In certain embodiments of the first embodiment, the reaction between the living end polymer chains and the first functionalizing compound is allowed to proceed for 0.3 to 2 hours (e.g., 0.3, 0.4, 0.5, 0.6, 0.7, 0.8, 0.9, 1, 1.2, 1.4, 1.6, 1.8, or 2 hours), preferably 0.3 to 1 hour prior to adding the first functionalizing compound.

According to the process of the first embodiment, the amount of second functionalizing compound used to react with polymer chain end functionalized with the first functionalizing compound may vary. Generally, the amount of second functionalizing compound can be described based upon the amount of initiator used in polymerizing the monomer(s). Preferably, the amount of second functionalizing compound that is utilized will be a molar amount that is less than or equal to the molar amount of first functionalizing compound utilized. In certain embodiments, a lesser molar amount of second functionalizing compound may be utilized than the first functionalizing compound since each second functionalizing compound has the capability of bonding to (coupling) more than one polymer chain end functionalized with the first functionalizing compound. In certain embodiments of the first embodiment, the amount of second functionalizing compound that is utilized will be sufficient to functionalize 5 to 95% (e.g., 5%, 10%, 15%, 20%, 25%, 30%, 35%, 40%, 45%, 50%, 55%, 60%, 65%, 70%, 75%, 80%, 85%, 90%, 95%) or 10 to 85% of the polymer chain ends functionalizing with the first functionalizing compound. In certain embodiments of the first embodiment, the amount of second functionalizing compound that is utilized will be sufficient to functionalize a majority of the polymer chain ends functionalized with the first functionalizing compound. The foregoing percentages can be considered to be a molar % since they refer to the relative number of polymer chain ends functionalized with a first functionalizing compound that are then coupled to a second functionalizing compound. In certain embodiments of the first embodiment, the second functionalizing compound is utilized in a molar ratio of about 1:1 to about 0.1:1 (e.g., 1:1, 0.9:1, 0.8:1, 0.7:1, 0.6:1, 0.5:1, 0.4:1, 0.3:1, 0.2:1, 0.1) or 1:1 to 0.1:1, preferably about 0.5:1 to 0.1:1 or 0.5:1 to 0.1:1 (e.g., 0.5:1, 0.4:1, 0.3:1, 0.2:1, 0.1:1), based upon the amount of initiator used in polymerizing the monomer(s). In certain embodiments of the first embodiment, the second functionalizing compound is utilized in a molar amount that is 10-50% (e.g., 10%, 15%, 20%, 25%, 30%, 35%, 40%, 45%, 50%), or 15-35% of the molar amount of first functionalizing compound; the foregoing relative molar amounts can also be expressed in ratios (e.g., when second functionalizing compound is used in a molar amount that is 20% of the molar amount of the first functionalizing compound, they are used in a molar ratio of second to first of 1:5). As a non-limiting example, if the molar amount of first functionalizing compound used was 1:1 based upon the amount of initiator used for polymerizing, and the second functionalizing compound was utilized at 20% of the molar amount of the first functionalizing compound, the amount of second functionalizing compound would be 0.2:1 based upon the amount of initiator used for polymerizing.

Rubber Compositions

As discussed above, according to the third embodiment a rubber composition is provided which comprises (a) 10-100 parts of at least one functionalized diene monomer-containing polymer according to the second embodiment or produced according to the process of the first embodiment; (b) 0-90 parts of at least one diene monomer-containing polymer, preferably selected from the group consisting of natural rubber, polyisoprene, polybutadiene rubber, styrene-butadiene rubber, styrene-butadiene-isoprene rubber, isoprene-butadiene rubber, and combinations thereof; and (c) 10-100 phr of at least one carbon black filler and 0-100 phr of at least one silica filler. According to the third embodiment, the total amount of (a) and (b) is 100 parts.

As mentioned above, the functionalized diene monomer-containing polymer according to the second embodiment or produced according to the process of the first embodiment can be utilized in a rubber composition along with other ingredients. According to the third embodiment, the rubber composition comprises 10-100 parts (e.g., 10, 15, 20, 25, 30, 35, 40, 45, 50, 55, 60, 65, 70, 75, 80, 85, 90, 95 or 100 parts), 20-100 parts, 10-60 parts or 20-60 parts of the functionalized diene monomer-containing polymer.

In the rubber compositions according to the third embodiment, one or more additional rubbery polymers may be present in an amount of 0-90 parts (e.g., 0, 5, 10, 20, 30, 40, 50, 60, 70, 80, 90 parts). In those embodiments of the third embodiment when at least one diene monomer-containing polymer (b) is present, it may be selected from the group consisting of natural rubber, polyisoprene, polybutadiene rubber, styrene-butadiene rubber, styrene-butadiene-isoprene rubber, isoprene-butadiene rubber, and combinations thereof. In certain embodiments of the third embodiment, the amount of at least one diene monomer-containing polymer (b) is 40-80 phr and the amount of at least one functionalized diene monomer-containing polymer (a) is 20-60 phr.

Rubber compositions according to the third embodiment are considered to be especially suitable for use in preparing tire components, especially tire treads. Therefore, a tire component comprising a rubber composition according to the third embodiment should be considered to be fully disclosed herein; in certain such embodiments, the tire component is a tire tread.

In certain embodiments of the third embodiment, the use of the functionalized conjugated diene monomer-containing polymer of the second embodiment or a functionalized conjugated diene monomer-containing polymer made by the process of the first embodiment will result in improved properties for the rubber composition as compared to using a non-functionalized version of the conjugated diene monomer-containing polymer (preferably for comparison purposes having the same monomer content). In certain such embodiments, the improved property comprises a reduction in rolling resistance (e.g., as measured by tan δ at 60 C) of at least 10%, at least 15%, at least 20% or more (e.g., 100% or more in certain instances); in certain such embodiments the reduction in rolling resistance is 10-50%, 10-100%, 50-100% or 50-150%. In certain embodiments, the improved property comprises an increase in bound rubber of at least 10 percentage units, at least 15 percentage units, at least 20 percentage units or more; in certain such embodiments the increase in bound rubber is 10-50, 10-40, or 10-30 percentage units. Rolling resistance and bound rubber can be measured according to the procedures described in the working examples.

Fillers

According to the third embodiment, the rubber composition comprises (includes) 10-100 phr (e.g., 10, 20, 30, 40, 50, 60, 70, 80, 90, 100 phr) of at least one carbon black filler and 0-100 phr (e.g., 5, 10, 20, 30, 40, 50, 60, 70, 80, 90, 100 phr) of at least one silica filler. Accordingly, in certain embodiments, the rubber composition of the third embodiment may be devoid of silica filler. In other embodiments, the rubber composition of the third embodiment includes 10-100 phr of at least one carbon black filler and 5-100 phr of at least one silica filler. According to the third embodiment, one more or more than one carbon black filler may be utilized with no silica filler, one silica filler, or more than one silica filler may be utilized in the rubber composition. In certain embodiments of the third embodiment, the total amount of carbon black filler is 10-90 phr, 10-80 phr, 10-70 phr, 10-60 phr, 10-50 phr, 20-90 phr, 20-80 phr, 20-70 phr, 20-60 phr, 20-50 phr, 30-90 phr, 30-80 phr, 30-70 phr, 30-60 phr, or 30-50 phr. In certain embodiments of the third embodiment, the total amount of silica filler is 10-90 phr, 10-80 phr, 10-70 phr, 10-60 phr, 10-50 phr, 20-90 phr, 20-80 phr, 20-70 phr, 20-60 phr, 20-50 phr, 30-90 phr, 30-80 phr, 30-70 phr, 30-60 phr, or 30-50 phr.

In certain embodiments of the third embodiment, the rubber composition includes at least one reinforcing filler. In other words, in such embodiments, at least one of the at least one carbon black filler or the at least one silica filler is a reinforcing filler. The term "reinforcing filler" is used herein to refer to a particulate material that has a nitrogen absorption specific surface area ($N_2SA$) of about 20 $m^2/g$ or greater, including 20 $m^2/g$ or greater, more than about 50 $m^2/g$, more than 50 $m^2/g$, more than about 100 $m^2/g$, more than 100 $m^2/g$, more than about 125 $m^2/g$, and more than 125 $m^2/g$. In certain embodiments, the term "reinforcing filler" is alternatively or additionally used to refer to a particulate material that has a particle size of about 10 nm up to about 1000 nm, including 10 nm up to 1000 nm, about 10 nm up to about 50 nm, and 10 nm up to 50 nm. In certain embodiments of the third embodiment, the total amount of at least one reinforcing filler is including about 10 to about 200 phr, 10 to 200 phr, about 10 to about 175 phr, 10 to 175 phr, about 25 to about 150 phr, 25 to 150 phr, about 35 to about 150 phr, 35 to 150 phr, about 25 to about 125 phr, 25 to 125 phr, about 25 to about 100 phr, 25 to 100 phr, about 25 to about 80 phr, 25 to 80 phr, about 35 to about 125 phr, 35 to 125 phr, about 35 to about 100 phr, 35 to 100 phr, about 35 to about 80 phr, or 35 to 80 phr.

In certain embodiments of the third embodiment, the rubber composition includes at least one non-reinforcing filler. The non-reinforcing filler may be non-reinforcing carbon black, a non-black non-reinforcing filler, or a combination thereof. As used herein, the phrase "non-reinforcing filler" refers to a particulate material that has a nitrogen surface area of less than about 20 $m^2/g$ (including less than 20 $m^2/g$), and in certain embodiments less than about 10 $m^2/g$ (including less than 10 $m^2/g$); reinforcing extenders will have surface areas higher than the foregoing. The nitrogen surface area of particulate extender materials can be determined according to various standard methods (including ASTM D6556 or D3037). In certain embodiments of the third embodiment, the term non-reinforcing extender is additionally or alternatively used to refer to a particulate material that has a particle size of greater than about 1000 nm (including greater than 1000 nm); reinforcing extenders will have particle sizes less than the foregoing. In certain embodiments of the third embodiment, the rubber composition comprises (includes) one or more of the following non-reinforcing fillers: graphite, clay, titanium dioxide, magnesium dioxide, aluminum oxide, starch, boron nitride, silicon nitride, aluminum nitride, calcium silicate, or silicon carbide.

Suitable silica fillers for use in the rubber composition of certain embodiments of the third embodiment disclosed herein are well known. Non-limiting examples of silica fillers suitable for use in the rubber composition include, but are not limited to, precipitated amorphous silica, wet silica (hydrated silicic acid), dry silica (anhydrous silicic acid), fumed silica, calcium silicate and the like. Other suitable silica fillers for use in rubber compositions of certain embodiments of third embodiment disclosed herein include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4.3SiO_4.5H_2O$ etc.), aluminum calcium silicate ($Al_2O_3.CaO_2SiO_2$, etc.), and the like. Among the listed silica fillers, precipitated amorphous wet-process, hydrated silica fillers are preferred. Such silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different silica fillers. In certain embodiments of the third embodiment disclosed herein, the rubber composition comprises a silica filler having a surface area (as measured by the BET method) of about 32 $m^2/g$ to about 400 $m^2/g$ (including 32 $m^2/g$ to 400 $m^2/g$), with the range of about 100 $m^2/g$ to about 300 $m^2/g$ (including 100 $m^2/g$ to 300 $m^2/g$) being preferred, and the range of about 150 $m^2/g$ to about 220 $m^2/g$ (including 150 $m^2/g$ to 220 $m^2/g$) being included. In certain embodiments of the third embodiment disclosed herein, the rubber composition comprises silica filler having a pH of about 5.5 to about 7 or slightly over 7, preferably about 5.5 to about 6.8. Some of the commercially available silica fillers which can be used in the rubber compositions include, but are not limited to, Hi-Sil®190, Hi-Sil®210, Hi-Sil®215, Hi-Sil®233, Hi-Sil®243, and the like, produced by PPG Industries (Pittsburgh, Pa.). As well, a number of useful commercial grades of different silica fillers are also available from Degussa Corporation (e.g., VN2, VN3), Rhone Poulenc (e.g., Zeosil™ 1165MP), and J. M. Huber Corporation.

In certain embodiments of the third embodiment disclosed herein, the silica filler comprises a silica that has been pre-reacted with a silica coupling agent; preferably the pre-treated silica comprises a silica that has been pre-treated with a silane-containing silica coupling agent. In other embodiments of the third embodiment, the rubber composition comprises silica filler as well as a separate silica coupling agent (suitable silica coupling agents are discussed in more detail below).

As discussed above, according to the third embodiment disclosed herein, a carbon black filler is utilized in the rubber composition. Most (but not all) carbon blacks are reinforcing fillers. In certain embodiments of the third embodiment disclosed herein, the rubber composition comprises 10 to 100 phr (e.g., 10 phr, 20 phr, 30 phr, 40 phr, 50 phr, 60 phr, 70 phr, 80 phr, 90 phr, 100 phr, of at least one reinforcing carbon black filler. One or more than one carbon black filler may be utilized. When more than one reinforcing carbon black filler is utilized, the foregoing amounts should be understood to refer to the total amount of all reinforcing carbon black fillers. Generally, suitable reinforcing carbon black for use in certain embodiments of the third embodiment disclosed herein includes any of the commonly available, commercially-produced carbon blacks, including those having a surface area of at least about 20 $m^2/g$ (including at least 20 $m^2/g$) and, more preferably, at least about 35 $m^2/g$ up to about 200 $m^2/g$ or higher (including 35 $m^2/g$ up to 200 $m^2/g$). Surface area values used in this application are determined by ASTM D-1765 using the cetyltrimethylammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the third embodiment disclosed herein, the rubber composition includes a mixture of two or more of the foregoing blacks. Typical suitable reinforcing carbon blacks for use in certain embodiments of the third embodiment disclosed herein are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred. Non-limiting examples of non-reinforcing carbon blacks suitable for use in the rubber compositions of certain embodiments of the third embodiment include, but are not limited to, thermal blacks or the N9 series carbon blacks (also referred to as the N-900 series), such as those with the ASTM designation N-907, N-908, N-990, and N-991. Various carbon blacks meeting the foregoing are commercially available, including but not limited to Thermax® N990 carbon black from Cancarb Limited (Medicine Hat, Alberta, Canada).

In certain embodiments of the third embodiment, the rubber composition includes at least one filler in addition to carbon black (and in addition to the silica filler, when present). Non-limiting examples of suitable additional fillers include, but are not limited to, alumina, aluminum hydroxide, clay, magnesium hydroxide, boron nitride, aluminum nitride, titanium dioxide, reinforcing zinc oxide, aluminum hydroxide, talc, clay, alumina ($Al_2O_3$), aluminum hydrate ($Al_2O_3.H_2O$), aluminum hydroxide ($Al(OH)_3$), aluminum carbonate ($Al_2(CO_3)_2$), aluminum nitride, aluminum magnesium oxide ($MgOAl_2O_3$), pyrofilite ($Al_2O_3.4SiO_2.H_2O$), bentonite ($Al_2O_3.4SiO_2.2H_2O$), boron nitride, mica, kaolin, glass balloon, glass beads, calcium oxide (CaO), calcium hydroxide ($Ca(OH)_2$), calcium carbonate ($CaCO_3$), magnesium carbonate, magnesium hydroxide ($MH(OH)_2$), magnesium oxide (MgO), magnesium carbonate ($MgCO_3$), titanium oxide, titanium dioxide, potassium titanate, barium sulfate, zirconium oxide ($ZrO_2$), zirconium hydroxide [$Zr(OH)_2.nH_2O$], zirconium carbonate [$Zr(CO_3)_2$], crystalline aluminosilicates, reinforcing grades of zinc oxide (i.e., reinforcing zinc oxide), and combinations thereof.

Silica Coupling Agents

In certain embodiments of the third embodiment disclosed herein (particularly those wherein at least one silica filler is utilized), one or more silica coupling agents is utilized in the rubber composition. Silica coupling agents are useful in preventing or reducing aggregation of the silica filler in rubber compositions. Aggregates of the silica filler particles are believed to increase the viscosity of a rubber composition, and, therefore, preventing this aggregation reduces the viscosity and improves the processibility and blending of the rubber composition.

Generally, any conventional type of silica coupling agent can be used, such as those having a silane and a constituent component or moiety that can react with a polymer, particularly a vulcanizable polymer. The silica coupling agent acts as a connecting bridge between silica and the polymer. Suitable silica coupling agents for use in certain embodiments of the third embodiment disclosed herein include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments of the third embodiment, the silica coupling agent can be added to the rubber composition in the form of a pre-treated silica; a pre-treated silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

Alkyl alkoxysilanes have the general formula $R^1_p Si(OR^2)_{4-p}$ where each $R^2$ is independently a monovalent organic group, and p is an integer from 1 to 3, with the proviso that at least one $R^1$ is an alkyl group. Preferably p is 1. Generally, each $R^1$ independently comprises $C_1$ to $C_{20}$ aliphatic, $C_5$ to $C_{20}$ cycloaliphatic, or $C_6$ to $C_{20}$ aromatic; and each $R^2$ independently comprises $C_1$ to $C_6$ aliphatic. In certain exemplary embodiments, each $R^1$ independently comprises $C_6$ to $C_{15}$ aliphatic and in additional embodiments each $R^1$ independently comprises $C_8$ to $C_{14}$ aliphatic. Mercapto silanes have the general formula HS-$R^3$—Si($R^4$)($R^5$)$_2$ where $R^3$ is a divalent organic group, $R^4$ is a halogen atom or an alkoxy group, each $R^5$ is independently a halogen, an alkoxy group or a monovalent organic group. The halogen is chlorine, bromine, fluorine, or iodine. The alkoxy group preferably has 1-3 carbon atoms. Blocked mercapto silanes have the general formula BI-S-$R^6$—Si—$X_3$ with an available silyl group for reaction with silica in a silica-silane reaction and a blocking group B that replaces the mercapto hydrogen atom to block the reaction of the sulfur atom with the polymer. In the foregoing general formula, Bl is a block group which can be in the form of an unsaturated heteroatom or carbon bound directly to sulfur via a single bond; $R^6$ is $C_1$ to $C_6$ linear or branched alkylidene and each X is independently selected from the group consisting of $C_1$ to $C_4$ alkyl or $C_1$ to $C_4$ alkoxy.

Non-limiting examples of alkyl alkoxysilanes suitable for use in certain embodiments of the third embodiment disclosed herein include, but are not limited to, octyltriethoxysilane, octyltrimethoxysilane, trimethylethoxysilane, cyclohexyltriethoxysilane, isobutyltriethoxy-silane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrinnethoxysilane, decyltrimethoxysilane, dodecyltrimethoxysilane, tetradecyltrimethoxysilane, octadecyl-trimethoxysilane, methyloctyl dimethoxysilane, and mixtures thereof.

Non-limiting examples of bis(trialkoxysilylorgano)polysulfides suitable for use in certain embodiments of the third embodiment disclosed herein include bis(trialkoxysilylorgano) disulfides and bis(trialkoxysilylorgano)tetrasulfides. Specific non-limiting examples of bis(trialkoxysilylorgano) disulfides suitable for use in certain exemplary embodiments of the second and fourth embodiments disclosed herein include, but are not limited to, 3,3'-bis(triethoxysilylpropyl) disulfide, 3,3'-bis(trimethoxysilylpropyl)disulfide, 3,3'-bis (tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis (diphenylcyclohexoxysilylpropyl)disulfide, 3,3'-bis(ethyl-di-sec-butoxysilylpropyl)disulfide, 3,3'-bis (propyldiethoxysilylpropyl)disulfide, 12,12'-bis (triisopropoxysilylpropyl)disulfide, 3,3'-bis (dimethoxyphenylsilyl-2-methylpropyl)disulfide, and mixtures thereof. Non-limiting examples of bis(trialkoxysilylorgano)tetrasulfide silica coupling agents suitable for use in certain embodiments of the third embodiment disclosed herein include, but are not limited to, bis(3-triethoxysilylpropyl)tetrasulfide, bis(2-triethoxysilylethyl) tetrasufide, bis (3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69® by Evonik Degussa Corporation.

Non-limiting examples of mercapto silanes suitable for use in certain embodiments of the third embodiment disclosed herein include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercapto silanes suitable for use in certain embodiments of the third embodiment disclosed herein include, but are not limited to, those described in U.S. Pat. Nos. 6,127,468; 6,204,339; 6,528, 673; 6,635,700; 6,649,684; and U.S. Pat. No. 6,683,135, the disclosures of which are hereby incorporated by reference. Representative examples of the blocked mercapto silanes for use herein in certain exemplary embodiments disclosed herein include, but are not limited to, 2-triethoxysilyl-1-ethylthioacetate; 2-trimethoxysilyl-1-ethylthioacetate; 2-(methyldimethoxysilyl)-1-ethylthioacetate; 3-trimethoxysilyl-1-propylthioacetate; triethoxysilylmethyl-thioacetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dinnethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propylthioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetyl-norbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1- hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1 propypmethyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propylethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercapto silanes can be used. A further example of a suitable blocked mercapto silane for use in certain exemplary embodiments is NXT™ silane (3-octanoylthio-1-propyltriethoxysilane), commercially available from Momentive Performance Materials Inc. of Albany, N.Y.

Non-limiting examples of pre-treated silicas (i.e., silicas that have been pre-surface treated with a silane) suitable for use in certain embodiments of the third embodiment disclosed herein include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica. Coupsil 6508, Agilon 400™ silica from PPG Industries, Agilon 454® silica from PPG Industries, and 458® silica from PPG Industries. In those embodiments where the silica comprises a pre-treated silica, the pre-treated silica is used in an amount as previously disclosed for the silica filler (i.e., 5 to 100 phr, etc.).

When a silica coupling agent is utilized in a rubber composition according to the second or fourth embodiments disclosed herein, the amount used may vary. In certain embodiments of the third embodiment disclosed herein, the silica coupling agent is present in an amount sufficient to provide a ratio of the total amount of silica coupling agent to silica filler of about 1:100 to about 1:5 (i.e., about 0.01 to about 20 parts by weight per 100 parts of silica), including 1:100 to 1:5, about 1:100 to about 1:10, 1:100 to 1:10, about 1:100 to about 1:20, 1:100 to 1:20, about 1:100 to about 1:25, and 1:100 to 1:25 as well as about 1:100 to about 0:100 and 1:100 to 0:100. In certain embodiments according to the second and fourth embodiments disclosed herein, the rubber composition comprises about 0.01 to about 10 phr silica coupling agent, including 0.01 to 10 phr, about 0.01 to about 5 phr, 0.01 to 5 phr, about 0.01 to about 3 phr, and 0.01 to 3 phr.

Cure Package

In certain embodiments of the third embodiment disclosed herein, the rubber composition includes (further comprises) a cure package. Generally, the cure package includes at least one of: a vulcanizing agent; a vulcanizing accelerator; a vulcanizing activator (e.g., zinc oxide, stearic acid, and the like); a vulcanizing inhibitor, and an anti-scorching agent. In certain embodiments of the third embodiment, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in certain embodiments of the third embodiment, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in certain embodiments of the third embodiment disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Other Ingredients

Various other ingredients that may optionally be added to the rubber compositions of the third embodiment disclosed herein include processing oils, waxes, processing aids, tackifying resins, plasticizing resins, reinforcing resins, and peptizers.

Various types of processing and extender oils may be utilized, including, but not limited to aromatic, naphthenic, and low PCA oils, as discussed above. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15, and FLEXON 683 from EXXONMOBIL, VIVATEC 200 from BP, PLAXOLENE MS from TOTAL FINA ELF, TUDALEN 4160/4225 from DAHLEKE, MES-H from REPSOL, MES from Z8, and OLIO MES S201 from AGIP. Suitable TDAE oils are available as TYREX 20 from EXXONMOBIL, VIVATEC 500, VIVATEC 180, and ENERTHENE 1849 from BP, and EXTENSOIL 1996 from REPSOL. Suitable heavy naphthenic oils are available as SHELLFLEX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples include, but are not limited to, soy or soybean oil, sunflower oil (including high oleic sunflower oil having an oleic acid content of at least 60%, at least 70% or at least 80%), safflower oil, corn oil, linseed oil, cotton seed oil, rapeseed oil, cashew oil, sesame oil, camellia oil, jojoba oil, macadamia nut oil, coconut oil, and palm oil. Generally, for most applications the total amount of oil used (processing oil and any extender oil) in the rubber compositions disclosed herein ranges from about 1 to about 70 phr, including 1 to 70 phr, about 2 to about 60 phr, 2 to 60 phr, about 3 to about 50 phr, and 3 to 50 phr. However, in certain applications, the total amount of oil used (processing oil and any extender oil) in the rubber compositions and methods disclosed herein is much higher and ranges up to about 175 phr, including up to 175 phr, up to about 150 phr, up to 150 phr, up to about 100 phr, and up to 100 phr.

In certain embodiments of the third embodiment, the rubber composition comprises about 5 to about 60 phr (e.g., 5, 10, 15, 20, 25, 30, 35, 40, 45, 50, 55, or 60 phr), 5 to 60 phr, 5 to 20 phr, about 25 to about 60 phr, 25 to 60 phr, or 30 to 50 phr of at least one resin; in certain such embodiments the at least one resin is a plasticizing resin. As used herein, the term plasticizing resin refers to a compound that is solid at room temperature (23° C.) and is miscible in the rubber composition at the amount used which is usually at least 5 phr. Generally, the plasticizing resin will act as a diluting agent and can be contrasted with tackifying resins which are generally immiscible and may migrate to the surface of a rubber composition providing tack. In certain embodiments of the third embodiment, wherein a plasticizing resin is utilized, it comprises a hydrocarbon resin and may be aliphatic type, aromatic type or aliphatic/aromatic type depending on the monomers contained therein. Examples of suitable plasticizing resins for use in the rubber compositions of the third embodiment include, but are not limited to, cyclopentadiene (abbreviated to CPD) or dicyclopentadiene (abbreviated to DCPD) homopolymer or copolymer resins, terpene homopolymer or copolymer resins and C5 fraction homopolymer or copolymer resins. Such resins may be used, for example, individually or in combination. In certain embodiments of the third embodiment, a plasticizing resin is used which meets at least one of the following: a Tg greater than 30° C. (preferably greater than 40° C. and/or no more than 120° C. or no more than 100° C.), a number average molecular weight (Mn) of between 400 and 2000 grams/mole (preferably 500-2000 grams/mole), and a polydispersity index (PI) of less than 3 (preferably less than 2), wherein PI=Mw/Mn and Mw is the weight-average molecular weight of the resin. Tg of the resin can be measured by DSC (Differential Scanning calorimetry) according to ASTM D3418 (1999). Mw, Mn and PI of the resin may be determined by size exclusion chromatography (SEC), using THF, 35° C.; concentration 1 g/l; flow rate 1 milliliters/min; solution filtered through a filter with a porosity of 0.45 µm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

Methods for Preparing Rubber Compositions

Rubber compositions according to the third embodiment disclosed herein may generally be formed by mixing together the ingredients for the rubber composition (as disclosed above) by methods known in the art, such as, for example, by kneading the ingredients together in a Banbury mixer or on a milled roll. These methods generally include at least one non-productive master-batch mixing stage and a final productive mixing stage. The term non-productive master-batch stage is known to those of skill in the art and generally understood to be a mixing stage where no vulcanizing agents or vulcanization accelerators are added. The term final productive mixing stage is also known to those of skill in the art and generally understood to be the mixing stage where the vulcanizing agents and vulcanization accelerators are added into the rubber composition. In certain embodiments of the third embodiment, one non-productive master-batch mixing stage may be used in preparing the rubber composition. In certain embodiments of the third embodiment, more than one non-productive master-batch mixing stage is used. In certain embodiments of the third embodiment where silica and silica coupler is utilized, more than one non-productive master-batch mixing stage is used and at least a portion of the silica filler is added in a second non-productive master-batch mixing stage (also described as a re-mill stage); in certain such embodiments, all silica coupling agent is added only in the second non-productive master-batch mixing stage (along with at least a portion of the silica filler) and no silica coupling agent is added in an initial non-productive master-batch mixing stage.

In certain embodiments of the third embodiment, the rubber composition is prepared by a process with the non-productive master batch mixing stage(s) conducted at a temperature of about 130° C. to about 200° C. In certain embodiments of the third embodiment, the rubber composition is prepared by a process with the final productive mixing stage conducted at a temperature below the vulcanization temperature in order to avoid unwanted pre-cure of the rubber composition. Therefore, the temperature of the productive mixing stage should not exceed about 120° C. and is typically about 40° C. to about 120° C., or about 60° C. to about 110° C. and, especially, about 75° C. to about 100° C.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should specifically be understood that functionalized conjugated diene monomer-containing polymers using/ having different first functional compounds/groups (i.e., according to structure I or structure II, as discussed above) and using/having different second functional compounds/ groups (i.e., according to structure I, structure II, or structure III, as discussed above), or using/having different combinations of the first and second functional compounds/groups can be prepared and used in rubber compositions. It should also be understood that the functionalized conjugated diene monomer-containing polymer or other such polymers (as mentioned in the foregoing) can be utilized in rubber compositions along with ingredients (e.g., additional rubber(s), fillers, cure package ingredients) that differ in relative amount, composition, or both from those used in the examples (i.e., as fully as disclosed in the preceding paragraphs).

As explained in detail below, conjugated diene monomer-containing polymers were produced in Examples 1-6. Examples 3-6 can be considered to be functionalized conjugated diene-containing polymers exemplary of the second embodiment and produced according to processes that are exemplary of the first embodiment whereas Examples 1 and 2 should be considered as comparative or control examples. The polymers produced in Examples 1-6 were then used to prepare rubber compositions in Example 7. Rubber compositions 7D, 7E, 7F and 7J can be considered as exemplary of the third embodiment disclosed herein whereas Examples 7A, 7B, 7C, 7G, 7H and 7-I should be considered as comparative or control examples.

Example 1

Styrene-butadiene copolymers were prepared as Polymer 1 according to the following procedure. To a two gallon N₂ purged reactor equipped with a stirrer was added 1.542 kilograms of hexane, 0.412 kilograms of 33.0 weight % styrene in hexane, and 2.532 kilograms of 21.5 weight % butadiene in hexane. The reactor was charged with 3.9 milliliters of n-butyllithium (1.6 Molar) in hexane, followed 1.45 milliliters of 2,2-bis(2'-tetrahydrofuryl)propane (1.6 Molar in hexane), and the reactor jacket was heated to 50° C. After 30 minutes, the batch temperature peaked at 66.1° C. After an additional 35 minutes, the polymer cement was dropped into a dried 28-oz glass bottle and terminated with 2 milliliters isopropanol, and stirred at 50° C. water bath. After 30 minutes, the polymer cement was dropped into isopropanol containing butylated hydroxytoluene (BHT), and drum dried. The resulting polymer had a 20% styrene content and 55% vinyl bond content (in the butadiene portion of the polymer) and showed the following properties (table 1).

TABLE 1

| Polymer | Mn | Mw | Mp | MWD | % coupling | Tg (° C.) |
|---|---|---|---|---|---|---|
| 1 | 103015 | 108899 | 107981 | 1.06 | 0.0 | −35.4 |

In Tables 1-6, Mn indicates the number average molecular weight in grams/mole (by GPC), Mw indicates the weight average molecular weight in grams/mole (by GPC), Mp indicates the peak molecular weight in grams/mole (by GPC), MWD indicates the molecular weight dispersion or polydispersity (calculated by dividing Mw/Mn), and Tg indicates the glass transition temperature. Generally, the Mn, Mw and Mp of these polymers may be determined by using gel permeation chromatography (GPC) calibrated with polystyrene standards and Mark-Houwink constants for the polymer in question. The % coupling was also measured by GPC. The polymer Tg values were measured using a differential scanning calorimeter (DSC) instrument, manufactured by TA Instruments (New Castle, Delaware), the measurement was conducted using a temperature elevation of 10° C./minute after cooling at −120° C. A tangent was drawn to the base lines before and after the jump of the DSC curve. The temperature on the DSC curve was read at the point corresponding to the middle of the two contact points and used as Tg.

Example 2

Styrene-butadiene copolymers were prepared as Polymers 2A, 2B, 2C according to the following procedure. To a two gallon N₂ purged reactor equipped with a stirrer was added 1.542 kilograms of hexane, 0.412 kilograms of 33.0 weight % styrene in hexane, and 2.532 kilograms of 21.5 weight % butadiene in hexane. The reactor was charged 3.9 milliliters of n-butyllithium (1.6 Molar) in hexane, followed 1.45 milliliters of 2,2-bis(2'-tetrahydrofuryl)propane (1.6 Molar in hexane), and the reactor jacket was heated to 50° C. After 29 minutes, the batch temperature peaked at 66.7° C. After an additional 35 minutes, the polymer cement was dropped into three dried 28-oz glass bottles and terminated with 0.5 milliliters of N-Vinylcaprolactam [N-VCL, 1.0 Molar in hexane], 0.5 milliliters 1-Vinyl-2-pyrrolidinone (N-VP, 1.0 M in hexane), or 0.16 milliliters N-vinylformamide [N-VF, 3.2 Molar in THF/cyclohexane (1:1)], respectively, and stirred at 50° C. water bath. After 30 minutes, each of the polymer cements were dropped into isopropanol containing butylated hydroxytoluene (BHT), and drum dried. Each of the polymers had a 20% styrene content and 55% vinyl bond content (in the butadiene portion of the polymer). The polymers showed the following properties (table 2).

TABLE 2

| Polymer | Mn | Mw | Mp | MWD | % coupling | Tg (° C.) |
|---|---|---|---|---|---|---|
| 2A | 140600 | 180755 | 111618 | 1.29 | 49.2 | −35.6 |
| 2B | 112694 | 126567 | 107788 | 1.12 | 15.7 | −35.9 |
| 2C | 105768 | 115577 | 104817 | 1.09 | 7.6 | −36.0 |

Example 3

A styrene-butadiene copolymer was prepared as Polymer 3 according to the following procedure. To a two gallon $N_2$ purged reactor equipped with a stirrer was added 1.506 kilograms of hexane, 0.412 kilograms of 33.0 weight % styrene in hexane, and 2.567 kilograms of 21.2 weight % butadiene in hexane. The reactor was charged 3.9 milliliters of n-butyllithium (1.6 Molar) in hexane, followed 1.45 milliliters of 2,2-bis(2'-tetrahydrofuryl)propane (1.6 Molar in hexane), and the reactor jacket was heated to 50° C. After 30 minutes, the batch temperature peaked at 64.8° C. After 35 minutes, 6.2 milliliters of 1-Vinyl-2-pyrrolidinone (N-VP, 1.0 Molar in hexane) in 15 milliliters of hexane was added. After an additional 35 minutes, 0.25 milliliters of 1,3-bis(trichlorosilyl)propane (BTCSP, 4.62 Molar) in 20 milliliters of hexane was added. (The molar ratio of BTCSP:VP was 1:5.) After 30 minutes, the polymer cement was dropped into isopropanol containing butylated hydroxytoluene (BHT), and drum dried. The polymer had a 20% styrene content and 55% vinyl bond content (in the butadiene portion of the polymer). The polymer showed the following properties (table 3).

TABLE 3

| Polymer | Mn | Mw | Mp | MWD | % coupling | Tg (° C.) |
|---|---|---|---|---|---|---|
| 3 | 150355 | 206093 | 122226 | 1.37 | 39.0 | −35.1 |

Example 4

A styrene-butadiene copolymer was prepared as Polymer 4 according to the following procedure. To a two gallon $N_2$ purged reactor equipped with a stirrer was added 1.506 kilograms of hexane, 0.412 kilograms of 33.0 weight % styrene in hexane, and 2.567 kilograms of 21.2 weight % butadiene in hexane. The reactor was charged with 1.8 milliliters of hexamethyleneimine (HMI, 3.0 Molar in cyclohexane) and 3.55 milliliters of n-butyllithium (1.6 Molar in hexane) in 15 milliliters of hexane, followed 1.45 milliliters of 2,2-bis(2'-tetrahydrofuryl)propane (1.6 Molar in hexane), and the reactor jacket was heated to 50° C. After 30 minutes, the batch temperature peaked at 67.9° C. After 35 minutes, 6.2 milliliters of N-Vinylcaprolactam (N-VCL, 1.0 Molar in hexane) in 15 milliliters of hexane was added. After an additional 35 minutes, 0.25 milliliters of 1,3-bis(trichlorosilyl)propane (BTCSP, 4.62 Molar) in 20 milliliters of hexane was added. (The molar ratio of BTCSP:VCL was 1:5.) After 30 minutes, the polymer cement was dropped into isopropanol containing butylated hydroxytoluene (BHT), and drum dried. The polymer had a 20% styrene content and 55% vinyl bond content (in the butadiene portion of the polymer). The polymer showed the following properties (table 4).

TABLE 4

| Polymer | Mn | Mw | Mp | MWD | % coupling | Tg (° C.) |
|---|---|---|---|---|---|---|
| 4 | 142311 | 205202 | 118031 | 1.44 | 40.1 | −38.0 |

Example 5

A styrene-butadiene copolymer was prepared as Polymer 5 according to the following procedure. To a two gallon $N_2$ purged reactor equipped with a stirrer was added 1.506 kilograms of hexane, 0.412 kilograms of 33.0 weight % styrene in hexane, and 2.567 kilograms of 21.2 weight % butadiene in hexane. The reactor was charged 1.8 milliliters of hexamethyleneimine (HMI, 3.0 Molar in cyclohexane) and 3.55 milliliters of n-butyllithium (1.6 Molar in hexane) in 15 milliliters of hexane, followed 1.45 milliliters of 2,2-bis(2'-tetrahydrofuryl)propane (1.6 Molar in hexane), and the reactor jacket was heated to 50° C. After 30 minutes, the batch temperature peaked at 69.8° C. After 35 minutes, 6.2 milliliters of 1-Vinyl-2-pyrrolidi-none (N-VP, 1.0 Molar in hexane) in 15 milliliters of hexane was added. After an additional 35 minutes, 0.25 milliliters of 1,3-bis(tri-chlorosilyl)propane (BTCSP, 4.62 Molar) in 20 milliliters of hexane was added. (The molar ratio of BTCSP:VP was 1:5.) After 30 minutes, the polymer cement was dropped into isopropanol containing butylated hydroxytoluene (BHT), and drum dried. The polymer had a 20% styrene content and 55% vinyl bond content (in the butadiene portion of the polymer). The polymer showed the following properties (table 5).

TABLE 5

| Polymer | Mn | Mw | Mp | MWD | % coupling | Tg (° C.) |
|---|---|---|---|---|---|---|
| 5 | 84656 | 209884 | 158367 | 2.48 | 21.0 | −36.0 |

Example 6

A styrene-butadiene copolymer was prepared as Polymer 6 according to the following procedure. To a two gallon $N_2$ purged reactor equipped with a stirrer was added 1.506 kilograms of hexane, 0.412 kilograms of 33.0 weight % styrene in hexane, and 2.567 kilograms of 21.2 weight % butadiene in hexane. The reactor was charged with 1.8 milliliters of hexamethyleneimine (HMI, 3.0 Molar in cyclohexane) and 3.55 milliliters of n-butyllithium (1.6 Molar in hexane) in 15 milliliters of hexane, followed by 1.45 milliliters of 2,2-bis(2'-tetrahydrofuryl)propane (1.6 Molar in hexane), and the reactor jacket was heated to 50° C. After 30 minutes, the batch temperature peaked at 65.4° C. After 35 minutes, 1.8 milliliters of N-vinylformamide (N-VF, 3.2 Molar in THF/cyclohexane (1:1)) in 15 milliliters of hexane was added. After an additional 35 minutes, 0.25 milliliters of 1,3-bis(tri-chlorosilyl)propane (BTCSP, 4.62 Molar) in 20 milliliters of hexane was added. (The molar ratio of BTCSP:N-VF was 1:5.) After 30 minutes, the polymer cement was dropped into isopropanol containing butylated hydroxytoluene (BHT), and drum dried. The polymer had a 20% styrene content and 55% vinyl bond content (in the butadiene portion of the polymer). The polymer showed the following properties (table 6).

TABLE 6

| Polymer | Mn | Mw | Mp | MWD | % coupling | Tg (° C.) |
|---|---|---|---|---|---|---|
| 6 | 111108 | 127881 | 117210 | 1.15 | 11.2 | −35.5 |

Example 7

The polymers produced according to Examples 1-6 were utilized to prepare rubber compositions according to the formulas provided in Table 7 below. The mixing procedure set forth in Table 8 was utilized in preparing the rubber compositions of Example 7.

TABLE 7

| Ingredient | Amount (phr) |
|---|---|
| Polymer | 100 |
| Carbon Black (N343) | 50 |
| Wax | 2 |
| Processing oil | 10 |
| Stearic acid | 2 |
| 6PPD | 0.95 |
| Final | |
| Sulfur | 1.5 |
| TBBS | 0.5 |
| MBTS | 0.5 |
| DPG | 0.3 |
| Zinc oxide | 2.5 |

TABLE 8

Mixing Parameters

| | | |
|---|---|---|
| Master-Batch Stage (initial temp: 130° C., rotor rpm started at 60) | 0 seconds 30 to 150 seconds | Charge polymers Charge any oil, carbon black filler and other master-batch ingredients, increase rotor speed to 90 rpm Drop based on max temperature of 165° C. or 4.5 minutes mixing (whichever comes first) |
| Final Batch Stage (initial temp: 65-70° C., rotor rpm at 45) | 0 seconds 0 seconds | Charge master-batch Charge curatives Drop based on max temperature of 100° C. or 2.5 minutes mixing (whichever comes first) |

For each of the rubber compositions of Example 7, the properties listed in Table 9 were determined as follows. Tan δ values were measured using a dynamic compression test done with a Dynastat™ mechanical spectrometer (Dynastatics Instruments Corp.; Albany, N.Y.) using a cylindrical button geometry test specimen (7.8 mm diameter×6 mm height). The temperature was held constant at the desired temperature of 60° C. The sample was compressed under a static load of 2 kg before testing. After it reached an equilibrium state, the test started with a dynamic compression load of 1.25 kg at a frequency of 15 Hz. The sample was then dynamically compressed and then extended and the resultant hysteresis (tan δ) was then recorded. A rubber composition's tan δ at 60° C. is indicative of its rolling resistance when incorporated into a tire tread.

The Mooney viscosities disclosed herein are compound values (determined upon the compounded rubber composition) were determined at 130° C. using an Alpha Technologies Mooney viscometer with a large rotor, a one minute warm-up time, and a four minute running time, and, hence are referred to as Mooney$_{1+4}$ or ML$_{1+4}$. More specifically, the Mooney viscosity was measured by preheating a sample from each batch to 130° C. for one minute before the rotor starts. The Mooney viscosity was recorded for each sample as the torque at four minutes after the rotor started. Generally, a lower Mooney viscosity is beneficial. Therefore, a lower index value for Mooney viscosity can be considered advantageous.

The bound rubber content test was used to determine the percent of polymer bound to filler particles in each rubber composition. Bound rubber was measured by immersing small pieces of uncured stocks in a large excess of toluene for three days. The soluble rubber was extracted from the sample by the solvent. After three days, any excess toluene was drained off and the sample was air dried and then dried in an oven at approximately 100° C. to a constant weight. The remaining pieces form a weak coherent gel containing the filler and some of the original rubber. The amount of rubber remaining with the filler is the bound rubber. The bound rubber content is then calculated according to the following:

$$\% \text{ Bound Rubber} = \frac{100(Wd - F)}{R}$$

where Wd is the weight of dried gel, F is the weight of filler in gel or solvent insoluble matter (same as weight of filler in original sample), and R is the weight of polymer in the original sample. The bound rubber percentage provides a means of measuring the interaction between the rubber (polymer) within a rubber composition and the filler, with relatively higher percentages of bound rubber indicating increased and beneficial interaction between the rubber (polymer) and filler.

TABLE 9

Rubber Compositions

| | Polymer # | ML1 + 4 | Tan δ at 60° C. | Bound rubber (%) |
|---|---|---|---|---|
| Example 7A | 1 (SBR) | 17.5 | 0.2221 | 8.82 |
| Example 7B | 2A (SBR-N-VCL) | 32.6 | 0.1098 | 39.18 |
| Example 7C | 2B (SBR-N-VP) | 29.6 | 0.1046 | 38.80 |
| Example 7D | 4 (SBR-N-VCL-BTCSP) | 65.2 | 0.0819 | 51.96 |
| Example 7E | 5 (SBR-N-VP-BTCSP) | 75.6 | 0.0875 | 51.15 |
| Example 7F | 3 (SBR-N-VP-BTCSP) | 44.1 | 0.0942 | 37.98 |
| Example 7G | 1C (SBR-BTMAPMDEOS) | 38.6 | 0.1123 | 38.53 |
| Example 7H | 1B (SBR-DMBAPTEOS) | 76.3 | 0.1432 | 27.10 |
| Example 7I | 2C (SBR-N-VF) | 18.5 | 0.2116 | 12.38 |
| Example 7J | 6 (HMI-SBR-N-VF-BTCSP) | 31.2 | 0.1236 | 30.65 |

As can be seen from the data of Table 9, rubber compositions 7D, 7E and 7F each exhibited improved properties, i.e., lower tan δ values and higher bound rubber values than the rubber composition containing non-functionalized polymer (composition 7A) and as compared to the rubber compositions containing polymer functionalized with only a first functionalizing group (rather than both first and second functionalizing groups). More specifically, the tan δ values for rubber composition 7D are 25% less than for control rubber composition 7B (containing SBR-VCL) and 128% less than for control rubber composition 7A (containing non-functionalized SBR). The tan δ values for rubber composition 7E are 16% less than for control rubber composition 7C (containing SBR-VP) and 61% less than for control rubber composition 7A (containing non-functionalized SBR). The tan δ values for rubber composition 7F are 10% less than for control rubber composition 7C (containing SBR-VP) and 58% less than for control rubber composition 7A (containing non-functionalized SBR). The tan δ values for rubber composition 7J are 42% less than for control rubber composition 7I (containing SBR-N-VF) and 44% less than for control rubber composition 7A (containing non-functionalized SBR). Thus, in each instance, the use of a functionalized conjugated diene monomer-containing polymer having both a first and a second functionalizing group, resulted in at least a 10% decrease in tan δ values, and in certain instances resulted in decreases in tan δ values of more than 20%. Additionally, the bound rubber values for rubber compositions 7D and 7E show an increase of more than 10 percentage units as compared to bound rubber values for control rubber compositions 7B and 7C. Similarly, the bound rubber value for rubber composition 7J shows and increase of more than 15 percentage units as compared to bound rubber values for control rubber composition 7I. The increase in bound rubber values is indicative of improved interaction between the polymer and carbon black filler. As well, the Mooney viscosities for rubber compositions 7D, 7E and 7F are all higher than the Mooney viscosities for control rubber compositions 7B and 7C, with 7D and 7E exhibiting Mooney viscosities at least 100% higher. The Mooney viscosity for rubber composition 7J is also higher than for control rubber composition 7I, more specifically about 70% higher.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the application, in its broader aspects, is not limited to the specific details and embodiments described. Accordingly, departures may be made from such details without departing from the spirit or scope of the applicant's general inventive concept.

This application discloses several numerical range limitations that support any range within the disclosed numerical ranges even though a precise range limitation is not stated verbatim in the specification because the embodiments could be practiced throughout the disclosed numerical ranges. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. As well, all numerical limitations and ranges that are preceded by the word "about" should be understood to include the particular number or range without the about as if fully set forth herein.

What is claimed is:

1. A functionalized diene monomer-containing polymer comprising
   at least one polymer chain comprised of at least one conjugated diene monomer, optionally in combination with at least one vinyl aromatic monomer,
   wherein each polymer chain is functionalized at its chain end with at least a first functionalizing group and is coupled via the first functionalizing group to a second functionalizing group,
   wherein the first functionalizing group results from a first functionalizing compound
   ii.

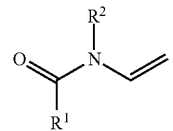

II wherein $R^1$ is selected from H and hydrocarbyl of C1-C20, and $R^2$ selected from H and hydrocarbyl of C1-C20, and
   the second functionalizing group results from a second functionalizing compound selected from:
   iii.

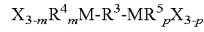

$X_{3-m}R^4_m M\text{-}R^3\text{-}MR^5_p X_{3-p}$    III wherein each M is an atom independently selected from Si and Sn; each X is a halogen; m is an integer of 0 or 1; p is an integer of 0 or 1; $R^4$ and $R^5$ when present are selected from C1-C20 hydrocarbyl; and $R^3$ is a divalent hydrocarbon of C1-C20, and may be linear or branched alkylene, linear or branched alkenylene or C6 to C20 arylene; or
   iv.

$X_3M\text{-}R^3CN$    IV wherein M is an atom selected from Si and Sn, each X is a halogen, and $R^3$ is a divalent hydrocarbon of C1-C20, and may be linear or branched alkylene, linear or branched alkenylene or C6 to C20 arylene; or
   and the first functionalizing group is present in a molar ratio of 1:1 to 6:1 compared to the second functionalizing group.

2. The polymer of claim 1, wherein the second functionalizing group results from a second functionalizing compound selected from (iii).

3. The polymer of claim 1, wherein the second functionalizing group results from a second functionalizing compound selected from (iv).

4. The polymer of claim 1, wherein the at least one conjugated diene monomer comprises 1,3-butadiene, optionally in combination with styrene.

5. The polymer of claim 1, wherein 5 to 95% of the polymer chain ends functionalized with the first functional compound are functionalized with the second functionalizing compound.

6. The polymer of claim 4, wherein the second functionalizing group results from a second functionalizing compound selected from (iii).

7. The polymer of claim 4, wherein the second functionalizing group results from a second functionalizing compound selected from (iv).

8. The polymer of claim 5, wherein the second functionalizing group results from a second functionalizing compound selected from (iii).

9. The polymer of claim 5, wherein the second functionalizing group results from a second functionalizing compound selected from (iv).

10. The polymer of claim 1, wherein the functionalized diene monomer-containing polymer is styrene-butadiene.

11. The polymer of claim 1, wherein the functionalized diene monomer-containing polymer is polybutadiene.

12. The polymer of claim 5, wherein the functionalized diene monomer-containing polymer is styrene-butadiene.

13. The polymer of claim 5, wherein the functionalized diene monomer-containing polymer is polybutadiene.

* * * * *